US012049986B2

(12) United States Patent
Ling

(10) Patent No.: US 12,049,986 B2

(45) Date of Patent: Jul. 30, 2024

(54) LIGHTING APPARATUS

(71) Applicant: BINOVO MANUFACTURING CO., LTD, Guangdong (CN)

(72) Inventor: Liangbin Ling, Guangdong (CN)

(73) Assignee: BINOVO MANUFACTURING CO., LTD, Guangdong (CN)

(*) Notice: Subject to any disclaimer, the term of this patent is extended or adjusted under 35 U.S.C. 154(b) by 0 days.

(21) Appl. No.: 18/513,676

(22) Filed: Nov. 20, 2023

(65) Prior Publication Data

US 2024/0167645 A1 May 23, 2024

(30) Foreign Application Priority Data

Nov. 21, 2022 (CN) ......................... 202223105925.1

(51) Int. Cl.
*F21L 4/00* (2006.01)
*F21L 4/02* (2006.01)
*F21V 17/18* (2006.01)
*F21Y 115/10* (2016.01)

(52) U.S. Cl.
CPC ............... *F21L 4/005* (2013.01); *F21L 4/027* (2013.01); *F21V 17/18* (2013.01); *F21Y 2115/10* (2016.08)

(58) Field of Classification Search
CPC . F21L 4/005; F21L 4/027; F21L 17/18; F21L 14/00; F21L 14/025; F21L 14/022; F21L 14/04; F21V 21/22
See application file for complete search history.

(56) References Cited

U.S. PATENT DOCUMENTS 8,087,797 B2 * 1/2012 Pelletier ............. H05B 45/3725 362/198
9,810,408 B2 * 11/2017 Fang ........................ F16M 1/00

FOREIGN PATENT DOCUMENTS

CN 110207053 A * 9/2019

OTHER PUBLICATIONS

Innovation Q+ NPL Search (Year: 2014).*

* cited by examiner

*Primary Examiner* — Anabel Ton
(74) *Attorney, Agent, or Firm* — Samson G. Yu

(57) ABSTRACT

Some embodiments of the disclosure disclose a lighting apparatus, which includes an end cover, at least two light-emitting modules and a cylinder body which are sequentially disposed, and further includes a telescopic sleeve rod, wherein the light-emitting modules are disposed in a surrounding manner, one end of each of the at least two light-emitting modules is hinged to the end cover while the other end of the each of the at least two light-emitting modules is detachably connected to the cylinder body, the telescopic sleeve rod penetrates through an inner space formed by the at least two light-emitting modules in a surrounding manner, and one end of the telescopic sleeve rod is connected with the cylinder body while the other end of the telescopic sleeve rod is connected to the end cover.

14 Claims, 6 Drawing Sheets

LIGHTING APPARATUS

TECHNICAL FIELD

The disclosure relates to the technical field of lighting, and relates to a lighting apparatus.

BACKGROUND ART

With the continuous development of human society, lighting apparatuses have become increasingly indispensable in people's lives. People need various lighting apparatuses for different occasions. However, existing lighting apparatuses have fixed lighting positions, so that the lighting angle and the lighting range are not adjustable, the diversified needs of users cannot be met, and the same lighting apparatus has a relatively simple function. In a case of different user needs, different lighting apparatuses need to be replaced, and the purchase of various lighting apparatuses results in a waste of resources, increased costs, and a waste of a storage space.

SUMMARY OF THE INVENTION

Some embodiments of the present disclosure provides a lighting apparatus which is capable of flexibly adjusting the lighting angle and the lighting range to overcome the problem that the lighting angle and the lighting range of existing lighting apparatuses are not adjustable.

In order to achieve the above objective, the technical solution adopted by the disclosure is that: a lighting apparatus includes an end cover, at least two light-emitting modules and a cylinder body which are sequentially disposed, and further includes a telescopic sleeve rod. The at least two light-emitting modules are disposed in a surrounding manner, one end of each light-emitting module is hinged to the end cover while the other end of each light-emitting module is detachably connected with the cylinder body, the telescopic sleeve rod penetrates through an inner space formed by the at least two light-emitting modules in a surrounding manner, and one end of the telescopic sleeve rod is connected with the cylinder body while the other end of the telescopic sleeve rod is connected with the end cover.

The lighting apparatus in the above solution is retractable to adjust the lighting height, and the light-emitting modules are adjusted from different angles to achieve lighting in different directions. The lighting apparatus achieves different lighting functions in unfolding and folding states, which meets the diversified needs of people, and is suitable for different occasions. Furthermore, the lighting apparatus is relatively small in the folding state, so that a storage space is saved. Specifically, the light-emitting modules provide the lighting function, and the cylinder body is configured to provide installation support. The telescopic sleeve rod is retractable to push the end cover forward or to contract, while driving the light-emitting modules to move forward or contract to adjust the lighting height, so as to change the lighting range and brightness. Each light-emitting module is hinged to the end cover to achieve the rotation of the light-emitting module relative to the end cover, so as to change the irradiation angle and the lighting direction of the light-emitting module to achieve lighting in different directions. The plurality of light-emitting modules are arranged in a surrounding manner to form a whole with the cylinder body in the folding state, and the plurality of light-emitting modules arranged in a surrounding manner enhance the lighting brightness.

In some embodiments, the number of light-emitting modules is two, and the two light-emitting modules are symmetrically disposed about the cylinder body. The two light-emitting modules abut against each other, and each light-emitting module is hinged to the end cover and in clamped connection with the cylinder body, so that the lighting apparatus is fixed after the light-emitting module is in clamped connection with the cylinder body, and when the lighting apparatus is unfolded, only a clamped connection between the light-emitting module and the cylinder body needs to be released, so that the end, far away from the end cover, of the light-emitting module becomes a free end, the light-emitting module rotates relative to the end cover as needed to adjust the angle of the light-emitting module, and then the lighting direction and the lighting range are changed. The light-emitting modules are symmetrically arranged, so that the lighting intensity is increased. When light condensation is needed, the two light-emitting modules arranged opposite to each other, so that the light is gathered towards the middle to increase the lighting brightness. When the irradiation range is relatively large, the two light-emitting modules are arranged back to each other to diverge light and expand the lighting range.

In some embodiments, the lighting apparatus further includes two connecting rods; one end of each of two connecting rods is hinged to the end cover while the other end of the two connecting rods is hinged to the light-emitting module. The connecting rods are taken as a connection bridge between the light-emitting modules and the end cover. Through the connecting rods, the angle of the light-emitting modules is adjusted conveniently, so that the light-emitting modules not only rotate with the end cover as the center, but also swing up and down or left and right, so as to achieve the adjustment at any angle, reduce the limitation on the rotation of the light-emitting modules, and further expand the flexibility of the lighting direction.

In some embodiments, the lighting apparatus includes a damping structure, the damping structure is disposed on the hinged positions of the connecting rods and the light-emitting modules. Through the arrangement of the damping structure, after the light-emitting modules adjust the rotation or swing angle relative to the connecting rods, the positions of the light-emitting modules and the connecting rods remain unchanged, and the angle does not change due to the gravity of the light-emitting modules. The damping structure makes the rotation or swing of the light-emitting modules relative to the connecting rods need to overcome a certain resistance, so as to prevent the non-human rotation affecting the positions of the light-emitting modules, thereby ensuring that the light-emitting modules always maintain the original irradiation range and irradiation direction unchanged during use.

In some embodiments, the lighting apparatus further includes a storage battery. The storage battery is disposed in the cylinder body, and the storage battery is electrically connected with the at least two light-emitting modules. The storage battery can be installed in the cylinder body, and the cylinder body protects the storage battery. The storage battery supplies power to the light-emitting modules to increase the applicable occasions of the lighting apparatus. An external power supply is not needed, so that the convenience for outdoor use is achieved. Specifically, spring wires are arranged in the cylinder body, so that the light-emitting modules are electrically connected to the storage battery through the spring wires.

In some embodiments, the lighting apparatus further includes a connecting seat, and the connecting seat is disposed on the end cover, the telescopic sleeve rod is in inserted connection with the connecting seat, and the light-emitting module is hinged to the connecting seat. The end of the telescopic sleeve rod is in inserted connection with the middle of the connecting seat, and a threaded connection can also be increased on the basis of an inserted connection to increase the reliability of the connection between the telescopic sleeve rod and the connecting seat. The light-emitting modules are hinged to a side of the connecting seat, so that the light-emitting modules rotate relative to the connecting seat. Specifically, the connecting rods are hinged to the connecting seat, and then the connecting rods are hinged to the light-emitting modules, and through the rotation of the connecting rods and connecting seat, changes in angles of the light-emitting modules relative to the connecting seat are achieved. The end cover is connected to the connecting seat and covers the connecting seat. Preferably, through the arrangement of the shape of the connecting seat, the limitation on the rotation angles of the connecting rods is formed to a certain extent, so that the connecting rods only rotate within the range of 0 to 90 degrees, which is convenient for the folding and unfolding of the light-emitting modules. The two connecting rods are located on both sides of the connecting seat, and are arranged symmetrically. When the two connecting rods are transverse I-shaped, the two connecting rods are arranged collinearly, and the lighting apparatus is in an unfolded state at this time. When the two connecting rods are parallel to each other, the light-emitting modules are in clamped connection with the cylinder body, and the lighting apparatus is in a folded state at this time. The connecting rods are accommodated in a space formed by the two light-emitting modules in a surrounding manner.

In some embodiments, the lighting apparatus includes a pressing ring, and the pressing ring is disposed on the end of the cylinder body away from the end cover; the lighting apparatus further includes a magnet, and the magnet is disposed on outside the pressing ring; or the lighting apparatus further includes a hanging ring, and the hanging ring is disposed on outside the pressing ring; or the lighting apparatus comprises a magnet and a hanging ring, the magnet and the hanging ring are disposed on outside the pressing ring. The pressing ring is configured to connect the magnet and the cylinder body or to connect the hanging ring and the cylinder body. The magnet adsorbs the lighting apparatus by using a magnetic function, which is convenient for hanging the lighting apparatus on an iron product. For example, the lighting apparatus is absorbed on a car or a bicycle by the magnet, which is convenient for outdoor lighting at night. The hanging ring is convenient for hanging.

In some embodiments, a hanging ring is disposed opposite to a magnet, and the hanging ring is rotatably connected with the pressing ring. The magnet and the hanging ring are disposed outside the pressing ring at the same time, the magnet and the hanging ring are of a semicircular structure, the pressing ring is of a circular structure, and the magnet and the hanging ring occupy half of the pressing ring. Further, the hanging ring is rotatably connected to the magnet, and the magnet is fixedly connected to the pressing ring. There can be two magnets, which are arcs of different sizes respectively and are concentrically arranged. When the hanging ring and the magnet are arranged vertically, the lighting apparatus is conveniently hung from the hanging ring, which is convenient for the use of the lighting apparatus, and when the hanging ring is in not in use, the hanging ring and the magnet are placed on the same plane, which is convenient for the storage of the hanging ring, so as to reduce the storage volume of the hanging ring.

In some embodiments, the telescopic sleeve rod is formed by sequentially arranging a plurality of sections of rod pieces in a sleeved manner, and a spring pin is disposed between the two adjacent sections of rod pieces. The plurality of sections of rod pieces are sequentially sleeved, the spring pin is in inserted connection with the rod pieces sequentially to achieve the connection between the two adjacent sections of the rod pieces, and the spring pin is pressed, so that the spring pin is retracted to pull out the telescopic sleeve rod, and the telescopic sleeve rod extends and is unfolded to adjust the lighting height. After loosening the spring pin, the spring pin sequentially penetrates through the two sections of rod pieces under the action of the restoring force, and through the insertion connection between the spring pin and the rod pieces, the limitation between the rod pieces is formed.

In some embodiments, light-emitting module includes a Light Emitting Diode lamp and a lampshade. The Light Emitting Diode lamp is detachably connected with the lampshade. The lampshade provides support for the Light Emitting Diode lamp, and the lamp holder is used as a connection transition between the Light Emitting Diode lamp and the rest of the components, one end of the lamp holder is in clamped connection with the cylinder body while the other end thereof abuts against the connecting seat, and an inner side of the lamp holder is further hinged to the connecting rods.

In some embodiments, the lighting apparatus includes a light source and a lamp holder, and the light source and the lamp holder are disposed in the cylinder body, and the light source is electrically connected with the storage battery. Specifically, the light source is disposed at the end of the cylinder body, is located between the hanging ring and the magnet, and is arranged toward the outside of the cylinder body, so that the disclosure has the functions of a flashlight, and also increases the lighting range and the lighting brightness of the lighting apparatus. One end of the lamp holder is configured to fix the light source while the other end thereof is configured to fix the storage battery.

The lighting apparatus of the disclosure rotates relative to the connecting seat through the connecting rods, so that the light-emitting modules are far away from the telescopic sleeve rod, and enough space is provided for the angle adjustment of the light-emitting modules. The light-emitting modules rotate relative to the connecting rod to achieve multi-angle lighting and change the lighting range. The lighting height is adjusted through the telescopic sleeve rod to achieve the adjustment of the lighting brightness. Moreover, the volume of the lighting apparatus in the folded state and storage state is changed to improve the convenience or portability for the storage of the lighting apparatus.

Figure 1:
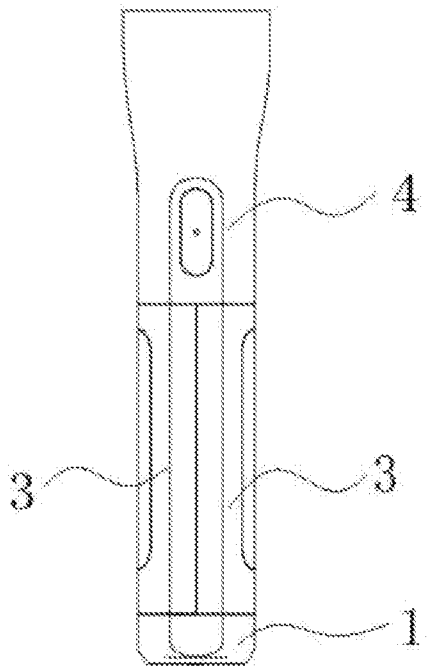
FIG. 1 illustrates a structural diagram of a lighting apparatus in a folded state in a first direction according to the disclosure.

Illustration of the following reference signs are as follows.

1. End cover; 2. Connecting seat; 3. Light-emitting module; 31. Light Emitting Diode lamp; 32. Lampshade; 4. Cylinder body; 41. Light source; 42. Lamp holder; 5. Telescopic sleeve rod; 51. Rod piece; 52. Spring pin; 6. Connecting rod; 7. Storage battery; 8. Pressing ring; 9. Magnet; 10. Hanging ring.

DETAILED DESCRIPTION OF THE INVENTION

The drawings are for illustrative purposes only, and cannot be construed as limiting the disclosure. In order to better illustrate the embodiment, certain components in the drawings will be omitted, enlarged or reduced and do not represent the actual size of the product. For those of ordinary skilled in the art, it is understandable that certain well-known structures and descriptions thereof in the drawings can be omitted. The positional relationships described in the drawings are for illustrative purposes only, and cannot be construed as limiting the disclosure.

The same or similar reference signs in the drawings of the embodiments of the disclosure correspond to the same or similar components. In the description of the disclosure, it is to be understood that the orientations or positional relationships indicated by the terms "upper", "down", "left", "right", "long", "short", etc. are based on the orientations or positional relationships shown in the drawings, and are only for the convenience of describing the disclosure and simplifying the description. The description does not indicate or imply that the apparatus or element referred to must have a specific orientation, be constructed and operated in a specific orientation. Therefore, the terms for describing the positional relationships in the drawings are for illustrative purposes only, and cannot be construed as limiting the disclosure. The specific meaning of the above-mentioned terminology can be understood by those of ordinary skill in the art in specific circumstances.

The technical solution of the disclosure is further specifically described in detail below through specific embodiments in combination with the drawings.

Embodiment 1

Figure 2:
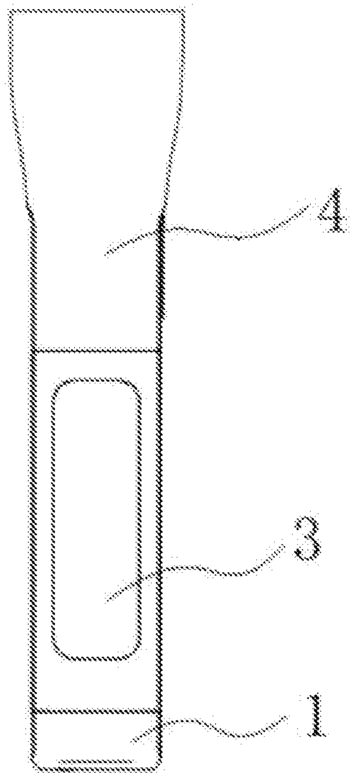
FIG. 2 illustrates a structural diagram of a lighting apparatus in a folded state in a second direction according to the disclosure.
Figure 3:
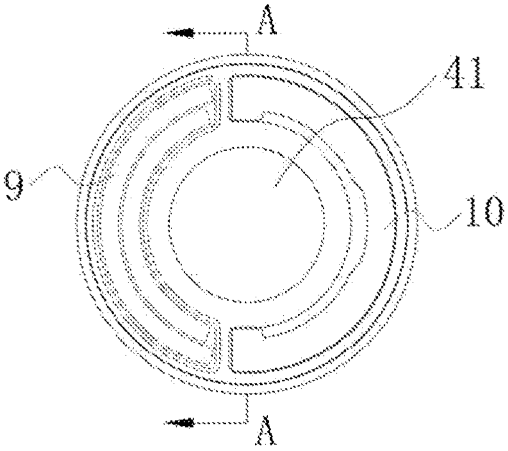
FIG. 3 illustrates a structural diagram of a lighting apparatus in a folded state in a third direction according to the disclosure.
Figure 4:
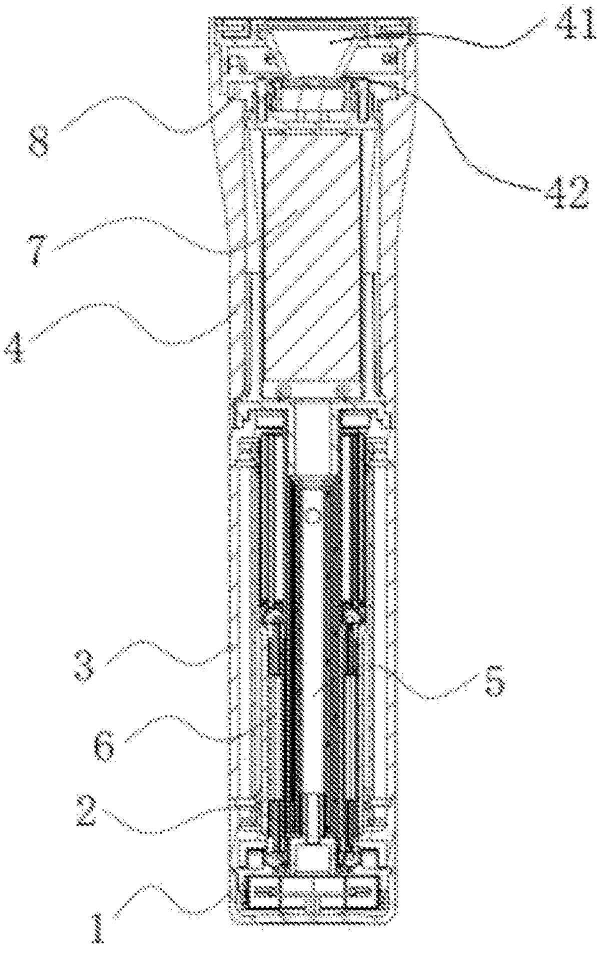
FIG. 4 illustrates an A-A section view of FIG. 3.
Figure 5:
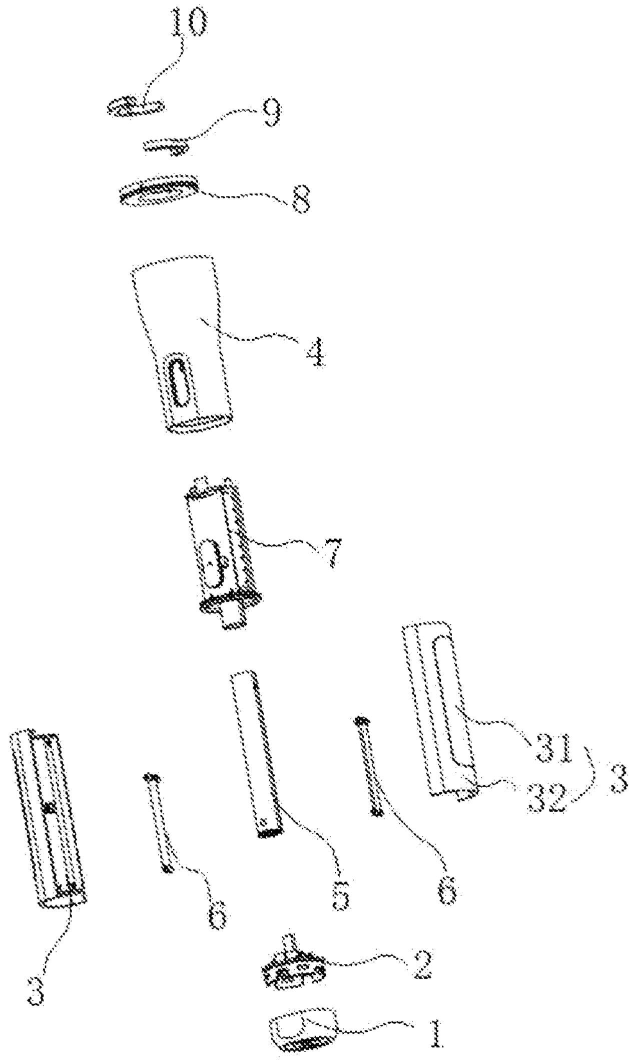
FIG. 5 illustrates a decomposition structure diagram of a lighting apparatus according to the disclosure.
Figure 6:
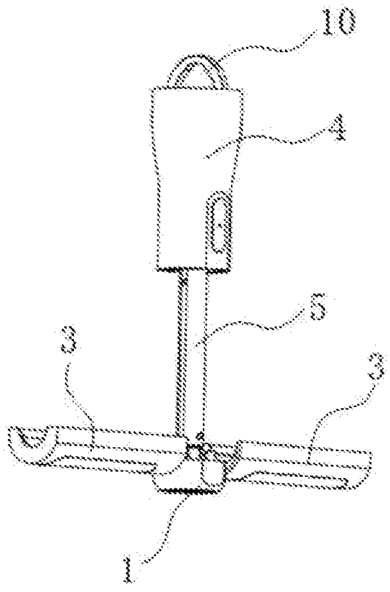
FIG. 6 illustrates a structural diagram of a lighting apparatus in a first unfolded state according to the disclosure.
Figure 7:
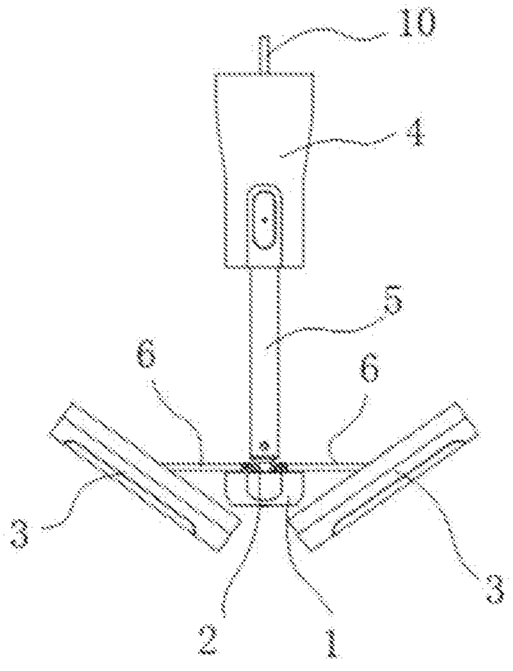
FIG. 7 illustrates a structural diagram of a lighting apparatus in a second unfolded state according to the disclosure.
Figure 8:
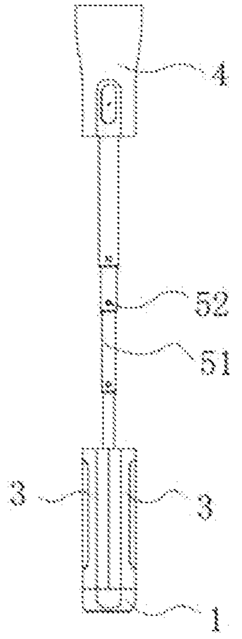
FIG. 8 illustrates a structural diagram of a lighting apparatus in a third unfolded state according to the disclosure.
Figure 9:
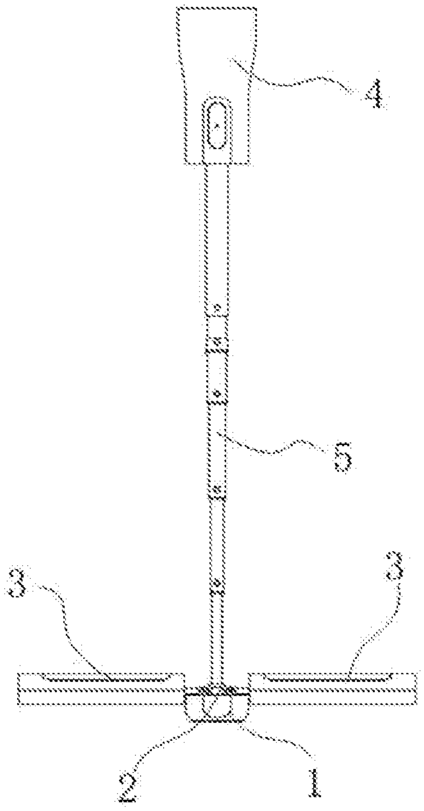
FIG. 9 illustrates a structural diagram of a lighting apparatus in a fourth unfolded state according to the disclosure.
Figure 10:
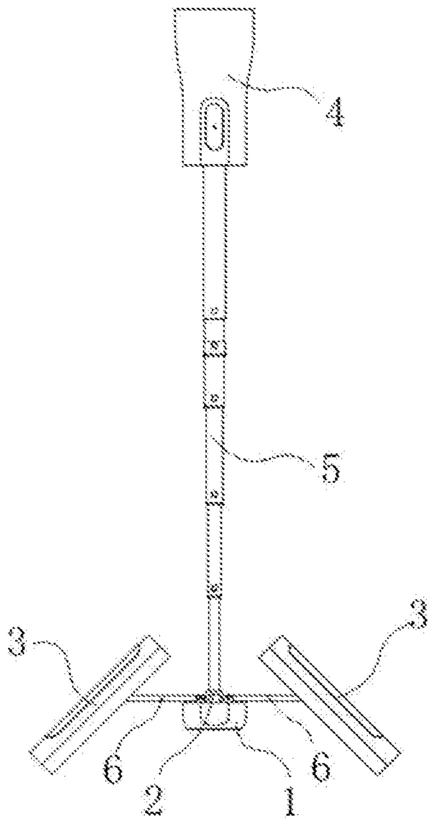
FIG. 10 illustrates a structural diagram of a lighting apparatus in a fourth unfolded state according to the disclosure.

FIG. 1 to FIG. 10 show Embodiment 1 of a lighting apparatus, which includes an end cover 1, at least two light-emitting modules 3 and a cylinder body 4 which are sequentially disposed, and further includes a telescopic sleeve rod 5. The light-emitting modules 3 are disposed in a surrounding manner, one end of each light-emitting module 3 is hinged to the end cover 1 while the other end of each light-emitting module 3 and the cylinder body 4 are in a clamped connection or a bolt connection. The light-emitting modules 3 form the first half of the lighting apparatus, the cylinder body 4 forms the back half of the lighting apparatus and a connection between the light-emitting modules 3 and the cylinder body 4 is in a smooth transition, so that the overall appearance of the lighting apparatus is more beautiful. From the appearance of the lighting apparatus, the whole lighting apparatus is divided into a part of the end cover 1, a part of the light-emitting modules 3 and a part of the cylinder body 4. The light-emitting modules 3 are connected with a power supply to provide energy for the light-emitting modules 3. The telescopic sleeve rod 5 penetrates through an inner space formed by the light-emitting modules 3 in a surrounding mode, and one end of the telescopic sleeve rod 5 is connected with the cylinder body 4 while the other end of the telescopic sleeve rod 5 is connected with the end cover 1. The whole telescopic sleeve rod 5 is hidden in inner sides of the light-emitting modules 3 in a contracted state, and the telescopic sleeve rod 5 cannot be seen from the outside of the lighting apparatus. Specifically, the number of light-emitting modules 3 is two, and the two light-emitting modules 3 are symmetrically disposed about the cylinder body 4. The cylinder body 4 is cylindrical shell with a hollow structure; the two symmetrical light-emitting modules 3 abut against each other and form a cylinder in a surrounding manner to form a whole with the cylinder body 4. The lighting apparatus further includes connecting rods 6. The number of connecting rods 6 is two, one end of each connecting rod 6 is hinged to the end cover 1 while the other end of each connecting rod 6 is hinged to the corresponding light-emitting module 3. Each connecting rod 6 is hinged to the middle of an inner side of the corresponding light-emitting module 3, and further, hinged positions of the connecting rods 6 and the light-emitting modules 3 are further provided with damping structure. Through the arrangement of the damping structure, after the light-emitting modules 3 adjust the rotation or swing angle relative to the connecting rods 6, the positions of the light-emitting modules 3 and the connecting rods 6 remain unchanged, and the angle does not change due to the gravity of the light-emitting modules 3. The damping structure makes the rotation or swing of the light-emitting modules 3 relative to the connecting rods 6 need to overcome a certain resistance, so as to prevent the non-human rotation affecting the positions of the light-emitting modules 3, thereby ensuring that the light-emitting modules 3 always maintain the original irradiation range and irradiation direction unchanged during use.

In some embodiments, the lighting apparatus further includes a storage battery 7. The storage battery 7 is disposed in the cylinder body 4, and the storage battery 7 is electrically connected with the light-emitting modules 3. The lighting apparatus can also be used as a flashlight, and the part of the cylinder body 4 is used as a handheld part. The storage battery 7 can be installed in the cylinder body 4, and the cylinder body 4 protects the storage battery 7. The storage battery 7 supplies power to the light-emitting modules 3 to increase the applicable occasions of the lighting apparatus. An external power supply is not needed, so that the convenience for outdoor use is achieved.

In some embodiments, the lighting apparatus further includes a connecting seat 2. The connecting seat 2 is disposed on the end cover 1, the telescopic sleeve rod 5 is in inserted connection with the connecting seat 2, and the light-emitting module 3 is hinged to the connecting seat 2. The telescopic sleeve rod 5 penetrates through the middle of the connecting seat 2, and the end of the telescopic sleeve rod 5 is connected with an inner side of the end cover 1. A shaft sleeve can also be disposed on the end, close to the telescopic sleeve rod 5, of the connecting seat 2, and through an interference fit between the shaft sleeve and the end of the telescopic sleeve rod 5, an inserted connection between the shaft sleeve and the telescopic sleeve rod 5 is achieved. A threaded connection can also be increased on the basis of the inserted connection to increase the reliability of the connection between the telescopic sleeve rod 5 and the connecting seat 2. The light-emitting modules 3 are hinged to a side of the connecting seat 2, so that the light-emitting modules 3 rotate relative to the connecting seat 2. Specifically, the connecting rods 6 are hinged to the connecting seat 2, and then the connecting rods 6 are hinged to the light-emitting modules 3 and through the rotation of the connecting rods 6 and connecting seat 2, changes in angles of the light-emitting modules 3 relative to the connecting seat 2 are achieved. The end cover is connected to the connecting seat, and covers outside the connecting seat 2. Preferably, through the arrangement of the shape of the connecting seat 2, the limitation on the rotation angles of the connecting rods 6 is formed to a certain extent, so that the connecting rods 6 only rotate within the range of 0 to 90 degrees, which is convenient for the folding and storage of the light-emitting modules 3. The two connecting rods 6 are located on both sides of the connecting seat 2, and are disposed symmetrically. When the two connecting rods 6 are transverse I-shaped, the two connecting rods 6 are disposed collinearly, and the lighting apparatus is in an unfolded state at this time. When the two connecting rods 6 are parallel to each other, the light-emitting modules 3 are in clamped connection with the cylinder body 4, and the lighting apparatus is in a folded state at this time. The connecting rods 6 are accommodated in a space formed by the two light-emitting modules 3 in a surrounding manner.

In some embodiments, the lighting apparatus further includes a pressing ring 8. The pressing ring 8 is disposed on the end of the cylinder body 4 away from the end cover 1. the lighting apparatus comprises a magnet 9, and the magnet 9 is disposed on outside the pressing ring 8; or the lighting apparatus comprises a hanging ring 10, and the hanging ring 10 is disposed on outside the pressing ring 8; or the lighting apparatus comprises a magnet 9 and a hanging ring 10, the magnet 9 and the hanging ring 10 are disposed on outside the pressing ring 8. The hanging ring 10 is disposed opposite to the magnet 9, and the hanging ring 10 is rotatably connected to the pressing ring 8. The magnet 9 and the hanging ring 10 are disposed outside the pressing ring 8 at the same time, and the magnet 9 and the hanging ring 10 are of a semicircular structure. Further, the hanging ring 10 is rotatably connected with the magnet 9, and the magnet 9 is fixedly connected to the pressing ring 8. When the hanging ring 10 and the magnet 9 are disposed vertically, the lighting apparatus is conveniently hung from the hanging ring 10, which is convenient for the use of the lighting apparatus, and when the hanging ring 10 is in not in use, the hanging ring 10 and the magnet 9 are placed on the same plane, which is convenient for the storage of the hanging ring 10, so as to reduce the storage volume of the hanging ring 10.

In some embodiments, the telescopic sleeve rod 5 is formed by sequentially arranging a plurality of sections of rod pieces 51 in a sleeved manner, and a spring pin 52 is disposed between the two adjacent sections of rod pieces 51. The plurality of sections of rod pieces 51 are sequentially sleeved, the spring pin 52 and the rod pieces 51 are sequentially inserted to achieve the connection between the two adjacent sections of the rod pieces 51, and the spring pin 52 is pressed, so that the spring pin 52 is retracted to pull out the telescopic sleeve rod 5, and the telescopic sleeve rod extends and is unfolded to adjust the lighting height. After loosening the spring pin 52, the spring pin 52 sequentially penetrates through the two sections of rod pieces 51 under the action of the restoring force, and through the insertion connection between the spring pin 52 and the rod pieces 51, the limitation between the rod pieces 51 is formed.

In some embodiments, each light-emitting module 3 includes a Light Emitting Diode lamp 31 and a lampshade 32. The Light Emitting Diode lamp 31 is detachably connected with the lampshade 32.

In some embodiments, a light source 41 and a lamp holder 42 are disposed in the cylinder body 4, and the light source 41 is electrically connected with the storage battery 7. Specifically, the light source 41 is disposed at the end of the cylinder body 4, is located between the hanging ring 10 and the magnet 9, and is disposed toward the outside of the cylinder body 4, so that the disclosure has the functions of a flashlight, and also increases the lighting range and the lighting brightness of the lighting apparatus.

Embodiment 2

The embodiment is Embodiment 2 of a lighting apparatus of the disclosure, which is similar to Embodiment 1 and differs in that the number of light-emitting modules 3 is three, and the three light-emitting modules 3 are uniformly distributed in a circumferential direction of a cylinder body 4. The number of connecting rods 6 is also three, respectively corresponding to the light-emitting modules 3 one by one, the more the light-emitting modules 3, the more the adjustable lighting directions, and the higher the flexibility of the lighting range.

Embodiment 3

The embodiment is Embodiment 3 of a lighting apparatus of the disclosure, which is similar to Embodiment 1 and differs in that the number of light-emitting modules 3 is four. The four light-emitting modules 3 are uniformly distributed in a circumferential direction of a cylinder body 4. The number of connecting rods 6 is also four, respectively corresponding to the light-emitting modules 3 one by one, when the four light-emitting modules 3 adjust the angles relative to the connecting rods 6, a pairwise symmetry shape is formed, the number of light-emitting modules 3 is increased, and the lighting apparatus is designed from the shape, so that the lighting apparatus has different shapes when being unfolded, thereby increasing the requirements for aesthetics and diversity.

It is apparent that, the above-mentioned embodiments of the disclosure are only examples for clearly illustrating the disclosure and are not intended to limit the implementations of the disclosure. Other variations or modifications in various forms can be made by those of ordinary skill in the art based on the above description. There is no need and no way to exhaust all of the implementations. Any modification, equivalent replacement and improvement made in the spirit and principle of the disclosure shall be included in the scope of protection of the claims of the disclosure.

What is claimed is:

1. A lighting apparatus, comprising an end cover, at least two light-emitting modules and a cylinder body which are sequentially disposed, and further comprising a telescopic sleeve rod, wherein the at least two light-emitting modules are disposed in a surrounding manner, one end of each of the at least two light-emitting modules is hinged to the end cover while the other end of the each of the at least two light-emitting modules is detachably connected with the cylinder body, the telescopic sleeve rod penetrates through an inner space formed by the at least two light-emitting modules in a surrounding mode, and one end of the telescopic sleeve rod is connected with the cylinder body while the other end of the telescopic sleeve rod is connected with the end cover.

2. The lighting apparatus as claimed in claim 1, wherein a number of light-emitting modules is two, and two light-emitting modules are symmetrically disposed about the cylinder body.

3. The lighting apparatus as claimed in claim 2, wherein the lighting apparatus comprises two connecting rods, one end of each of the two connecting rods is hinged to the end cover while the other end of the each of the two connecting rods is hinged to the light-emitting module.

4. The lighting apparatus as claimed in claim 3, wherein the lighting apparatus comprises a damping structure, the damping structure is disposed on hinged positions of the connecting rods and the at least two light-emitting modules.

5. The lighting apparatus as claimed in claim 1, wherein the lighting apparatus comprises a storage battery, the storage battery is disposed on the cylinder body, and the storage battery is electrically connected with the at least two light-emitting modules.

6. The lighting apparatus as claimed in claim 2, wherein the lighting apparatus comprises a storage battery, wherein the storage battery is disposed on the cylinder body, and the storage battery is electrically connected with the at least two light-emitting modules.

7. The lighting apparatus as claimed in claim 3, wherein the lighting apparatus comprises a storage battery, wherein the storage battery is disposed on the cylinder body, and the storage battery is electrically connected with the at least two light-emitting modules.

8. The lighting apparatus as claimed in claim 4, wherein the lighting apparatus comprises a storage battery, wherein the storage battery is disposed on the cylinder body, and the storage battery is electrically connected with the at least two light-emitting modules.

9. The lighting apparatus as claimed in claim 5, wherein the lighting apparatus comprises a connecting seat, wherein the connecting seat is disposed on the end cover, the telescopic sleeve rod is in inserted connection with the connecting seat, and the at least two light-emitting modules are hinged to the connecting seat.

10. The lighting apparatus as claimed in claim 9, wherein the lighting apparatus comprises a pressing ring, wherein the pressing ring is disposed on an end of the cylinder body away from the end cover, the lighting apparatus comprises a magnet, and the magnet is disposed on an outside the pressing ring; or the lighting apparatus comprises a hanging ring, and the hanging ring is disposed on an outside the pressing ring; or the lighting apparatus comprises a magnet and a hanging ring, the magnet and the hanging ring are disposed on an outside the pressing ring.

11. The lighting apparatus as claimed in claim 9, wherein the lighting apparatus comprises a pressing ring, a magnet and a hanging ring, the pressing ring is disposed on an end of the cylinder body away from the end cover, the magnet and the hanging ring are disposed on an outside the pressing ring; the hanging ring is disposed opposite to the magnet, and the hanging ring is rotatably connected with the pressing ring.

12. The lighting apparatus as claimed in claim 1, wherein the telescopic sleeve rod is formed by sequentially disposing a plurality of sections of rod pieces in a sleeved manner, and the lighting apparatus comprises a spring pin, the spring pin is disposed between the two adjacent sections of rod pieces.

13. The lighting apparatus as claimed in claim 1, wherein each of the at least two light-emitting modules comprises a Light Emitting Diode lamp and a lampshade, and the Light Emitting Diode lamp is detachably connected with the lampshade.

14. The lighting apparatus as claimed in claim 5, wherein the lighting apparatus comprises a light source and a lamp holder, wherein the light source and the lamp holder are disposed in the cylinder body, and the light source is electrically connected with the storage battery.

* * * * *